United States Patent
Hasegawa

(12) 
(10) Patent No.: US 10,871,750 B2
(45) Date of Patent: Dec. 22, 2020

(54) PORTABLE ELECTRONIC TIMEPIECE, DISPLAY METHOD, AND STORAGE MEDIUM

(71) Applicant: CASIO COMPUTER CO., LTD., Tokyo (JP)

(72) Inventor: Kosuke Hasegawa, Koganei (JP)

(73) Assignee: CASIO COMPUTER CO., LTD., Tokyo (JP)

(*) Notice: Subject to any disclaimer, the term of this patent is extended or adjusted under 35 U.S.C. 154(b) by 52 days.

(21) Appl. No.: 16/128,300

(22) Filed: Sep. 11, 2018

(65) Prior Publication Data
US 2019/0094815 A1    Mar. 28, 2019

(30) Foreign Application Priority Data
Sep. 27, 2017 (JP) .................. 2017-186217

(51) Int. Cl.
*G01C 21/26* (2006.01)
*G01C 21/34* (2006.01)
(Continued)

(52) U.S. Cl.
CPC ............ *G04G 9/007* (2013.01); *G01C 21/26* (2013.01); *G01C 21/367* (2013.01);
(Continued)

(58) Field of Classification Search
CPC ............ G01C 21/367; G01C 21/3667; G01C 21/3626; G01C 21/36; G01C 21/34;
(Continued)

(56) References Cited

U.S. PATENT DOCUMENTS 5,274,387 A * 12/1993 Kakihara ............ G08G 1/0969
342/451
6,067,502 A * 5/2000 Hayashida ........... G01C 21/367
340/990
(Continued)

FOREIGN PATENT DOCUMENTS

CN 102227611 A 10/2011
JP H11118506 A 4/1999
(Continued)

OTHER PUBLICATIONS

Gruenefeld et al, "Visualizing Out-of-view Objects in Head-mounted Augmented Reality", MobileHCI '17, Sep. 4-7, 2017, Vienna, Austria. (Year: 2017).*
(Continued)

*Primary Examiner* — Julie Anne Watko
(74) *Attorney, Agent, or Firm* — Holtz, Holtz & Volek PC

(57) ABSTRACT

A portable electronic timepiece includes a display unit which displays an image, and a processor which is operative to display, on the display unit, route information on a traveling route of a user, switch a scale of the route information displayed on the display unit, and in a case where a given point set in association with the route information of a predetermined scale cannot be displayed within a display range of the display unit, change a display mode of the display unit to a display mode that is different from the display mode of displaying the route information.

6 Claims, 16 Drawing Sheets

(51) Int. Cl.
*G04G 9/00* (2006.01)
*G04G 21/00* (2010.01)
*G01C 21/36* (2006.01)
*G04G 21/02* (2010.01)
*G04G 21/04* (2013.01)
*G09B 29/00* (2006.01)

(52) U.S. Cl.
CPC ..... *G01C 21/3632* (2013.01); *G01C 21/3661* (2013.01); *G01C 21/3676* (2013.01); *G04G 9/0064* (2013.01); *G04G 21/00* (2013.01); *G04G 21/02* (2013.01); *G04G 21/04* (2013.01); *G01C 21/34* (2013.01)

(58) Field of Classification Search
CPC ........ G01C 21/26; G01C 21/24; G01C 21/00; G01C 21/3676; G01C 21/3661; G01C 21/3632; G04G 9/007; G04G 9/0064; G04G 21/00; G04G 21/02; G04G 21/04; G04G 9/00; G04G 21/08; G04G 99/00; G09B 29/00
See application file for complete search history.

(56) References Cited

U.S. PATENT DOCUMENTS

| | | | | |
|---|---|---|---|---|
| 6,163,752 | A * | 12/2000 | Sievers | G01C 21/367 340/988 |
| 7,292,936 | B2 * | 11/2007 | Furukawa | G01C 21/367 340/995.11 |
| 7,966,124 | B2 * | 6/2011 | Liu | G09B 29/106 701/457 |
| 8,032,297 | B2 * | 10/2011 | Jakobson | G08G 1/0969 340/995.14 |
| 8,671,365 | B2 | 3/2014 | Berus | |
| 10,422,656 | B2 * | 9/2019 | Wakayanagi | G06F 3/0485 |
| 10,508,926 | B2 * | 12/2019 | van Os | G06F 3/0482 |
| 2003/0018427 | A1 * | 1/2003 | Yokota | G01C 21/367 701/455 |
| 2005/0177304 | A1 * | 8/2005 | Tu | G01C 21/3632 701/459 |
| 2005/0261829 | A1 * | 11/2005 | Furukawa | G01C 21/367 701/414 |
| 2006/0174213 | A1 * | 8/2006 | Kato | G01C 21/367 715/800 |
| 2006/0229802 | A1 * | 10/2006 | Vertelney | G01C 21/3617 701/532 |
| 2007/0225904 | A1 * | 9/2007 | Pantalone | G01C 21/367 701/455 |
| 2007/0276596 | A1 * | 11/2007 | Solomon | G08G 1/096861 701/431 |
| 2009/0281720 | A1 * | 11/2009 | Jakobson | G01C 21/3682 701/426 |
| 2010/0123737 | A1 * | 5/2010 | Williamson | G06T 13/80 345/672 |
| 2010/0131850 | A1 * | 5/2010 | Berus | G01C 21/3632 715/727 |
| 2011/0320117 | A1 * | 12/2011 | Sempuku | G01C 21/367 701/425 |
| 2013/0345980 | A1 * | 12/2013 | van Os | G01C 21/3626 701/538 |
| 2015/0130845 | A1 * | 5/2015 | Otero | G06T 15/30 345/661 |
| 2015/0247736 | A1 * | 9/2015 | Moore | G01C 21/367 701/519 |
| 2015/0300832 | A1 * | 10/2015 | Moore | G06F 16/29 455/456.3 |
| 2015/0377628 | A1 * | 12/2015 | Arokiaraj | G01C 21/367 701/532 |
| 2015/0377643 | A1 * | 12/2015 | Arokiaraj | G01C 21/367 701/431 |
| 2016/0334240 | A1 * | 11/2016 | Arokiaraj | G01C 21/367 |
| 2018/0349413 | A1 * | 12/2018 | Shelby | G01C 21/3638 |
| 2019/0154459 | A1 * | 5/2019 | Arokiaraj | G01C 21/367 |
| 2019/0316931 | A1 * | 10/2019 | Bailiang | G01C 21/367 |

FOREIGN PATENT DOCUMENTS

| | | |
|---|---|---|
| JP | 2003329479 A | 11/2003 |
| JP | 2015060144 A | 3/2015 |
| WO | 2013046390 A1 | 4/2013 |

OTHER PUBLICATIONS

Gustafson et al, "Wedge: Clutter-Free Visualization of Off-Screen Locations", CHI 2008, Apr. 5-10, 2008, Florence, Italy, pp. 787-796. (Year: 2008).*
Baudisch and Rosenholtz, "Halo: a Technique for Visualizing Off-Screen Locations", CHI 2003, Apr. 5-10, 2003, Ft. Lauderdale, Florida, USA, pp. 481-488. (Year: 2003).*
Winebaum. Garmin Fenix 5X, Forerunner 935, Running Dynamics Pod-Reviews and Comparisons. In Action! Which to choose and Why. Apr. 5, 2017. https://www.roadtrailrun.com/2017/04/garmin-fenix-5x-forerunner-935-run.html (Year: 2017).*
Chinese Office Action (and English language translation thereof) dated Jun. 1, 2020 issued in Chinese Application No. 201811126313.6.

* cited by examiner

FIG. 4  (NAVIGATION PROCESSING STARTING MANIPULATION)
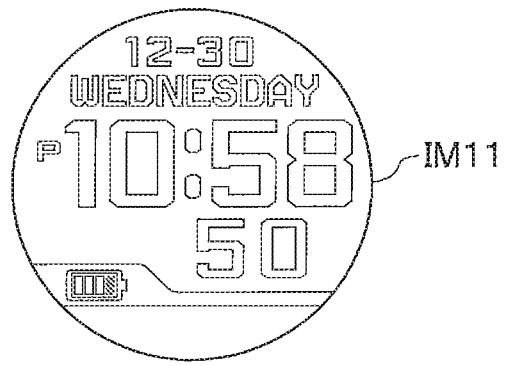
↓ 1SW (PRESSED)
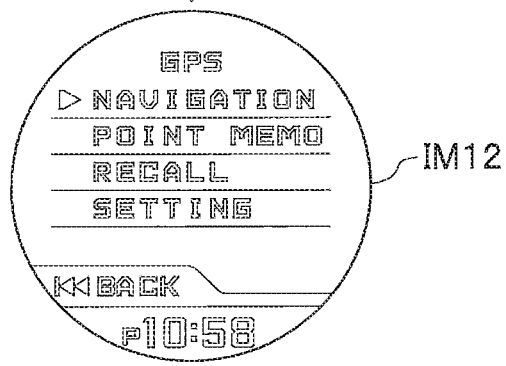
↓ RSW (PRESSED)
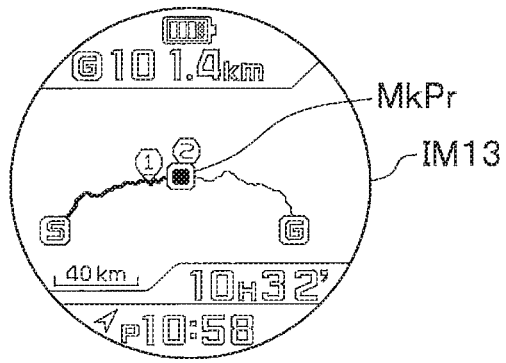
↓ RSW (PRESSED)
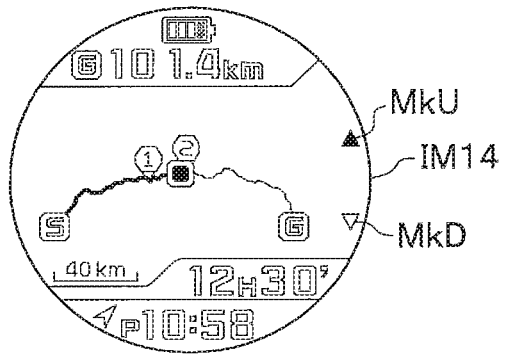

FIG. 7   (NAVIGATION PROCESSING EXECUTING MANIPULATION)
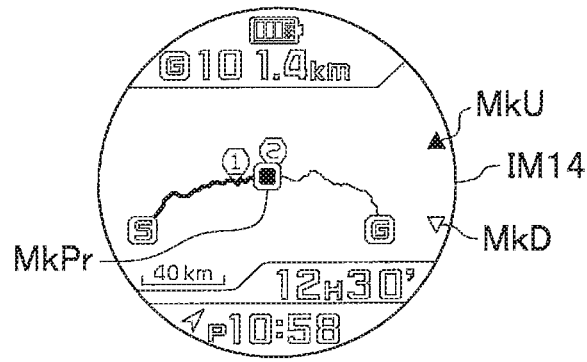
(ROTATED COUNTERCLOCKWISE) RSW ↑   ↓ RSW (ROTATED CLOCKWISE)
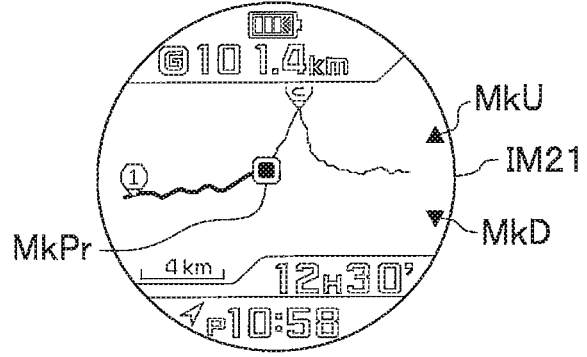
(ROTATED COUNTERCLOCKWISE) RSW ↑   ↓ RSW (ROTATED CLOCKWISE)
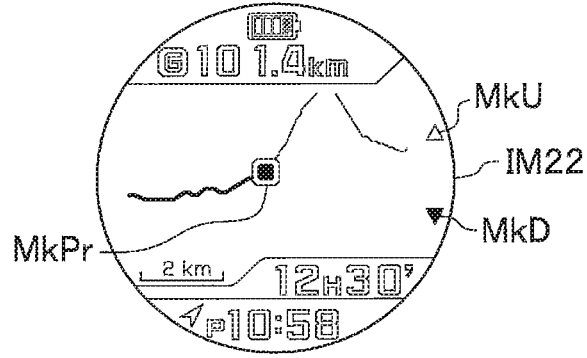
(ROTATED COUNTERCLOCKWISE) RSW ↑   ↓ RSW (ROTATED CLOCKWISE)
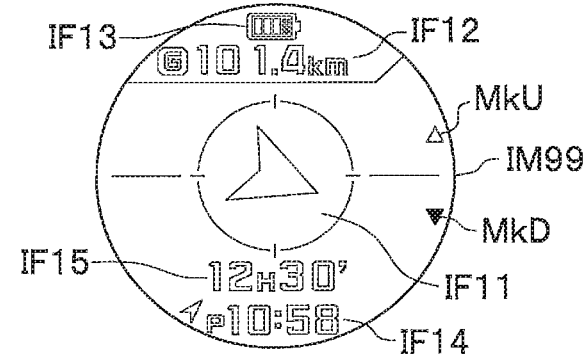

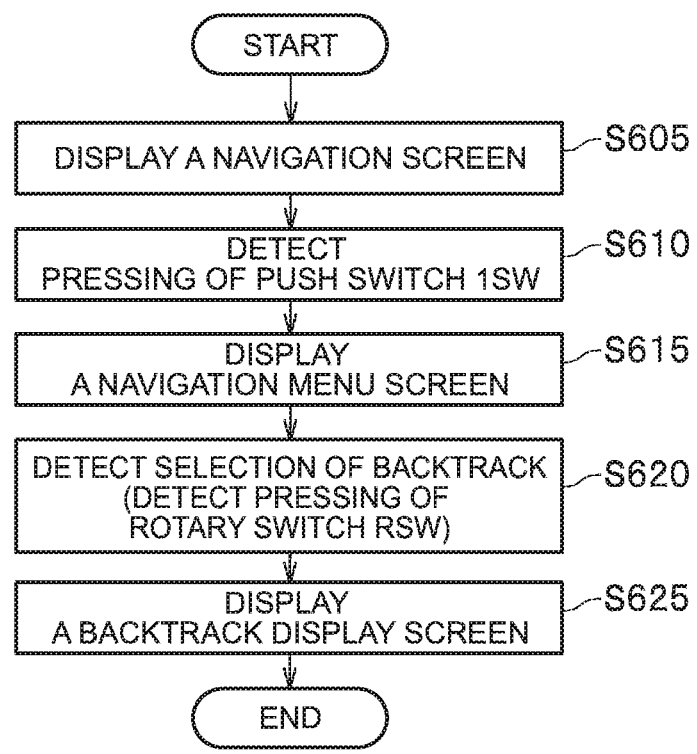

FIG. 11
(BACKTRACK SCREEN DISPLAYING MANIPULATION)
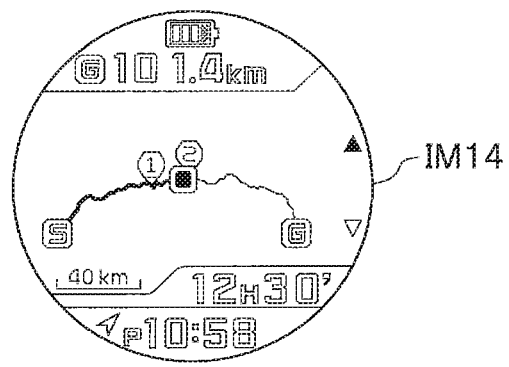
↓ 1SW (PRESSED)
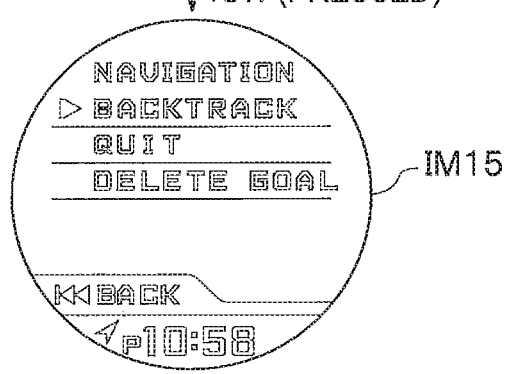
↓ RSW (PRESSED)
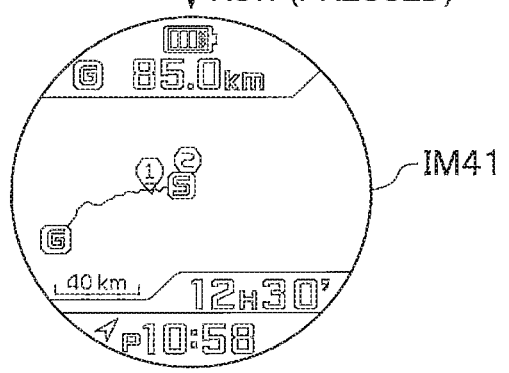

FIG. 13
(NAVIGATION PROCESSING QUITTING MANIPULATION)
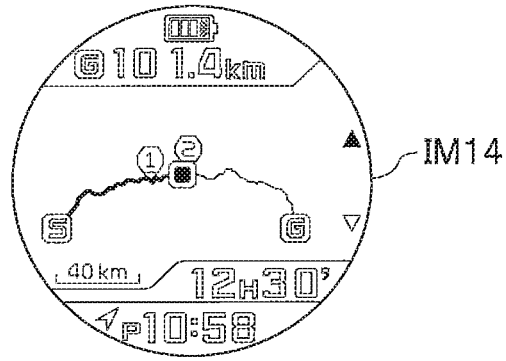
IM14
↓ 1SW (PRESSED)
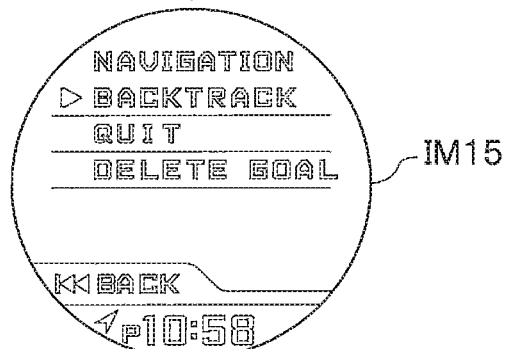
IM15
↓ RSW (ROTATED COUNTERCLOCKWISE)
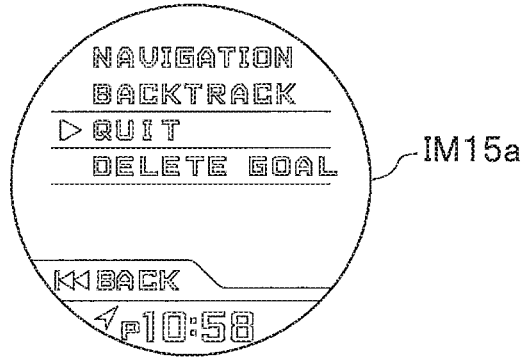
IM15a
↓ RSW (PRESSED)
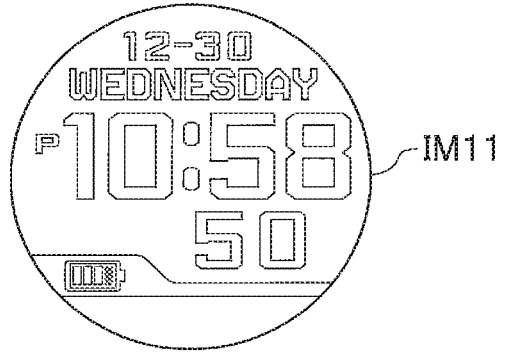
IM11

(GOAL POINT INFORMATION DELETING MANIPULATION)
FIG. 15
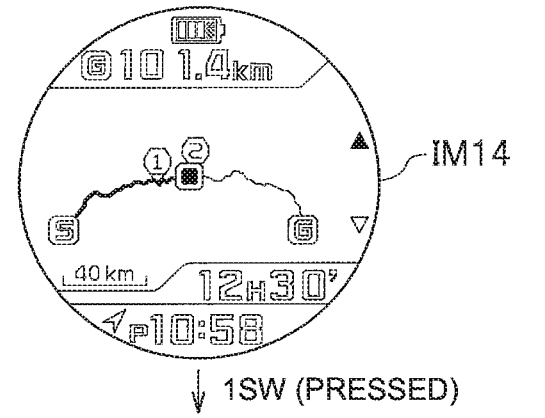
IM14
↓ 1SW (PRESSED)
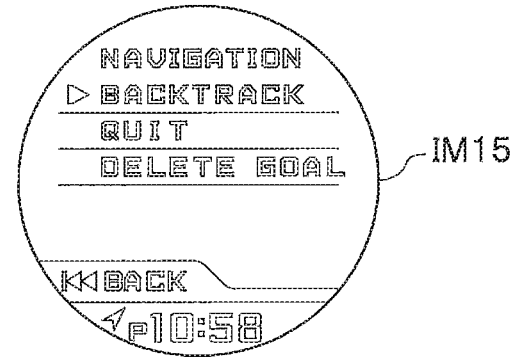
IM15
↓ RSW (ROTATED COUNTERCLOCKWISE TWICE)
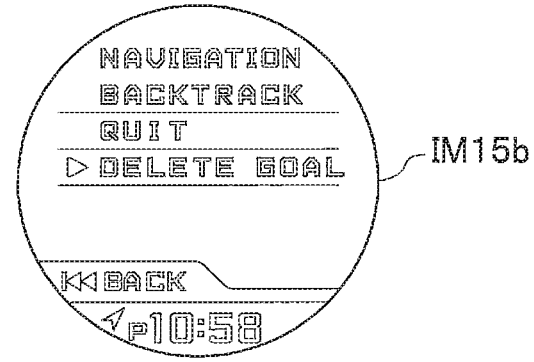
IM15b
↓ RSW (PRESSED)
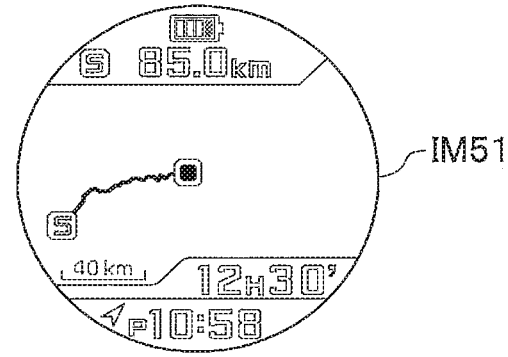
IM51

FIG. 16
(MANIPULATION FOR SWITCHING DISPLAY BETWEEN DESTINATION DIRECTION SCREEN AND COMPASS SCREEN)
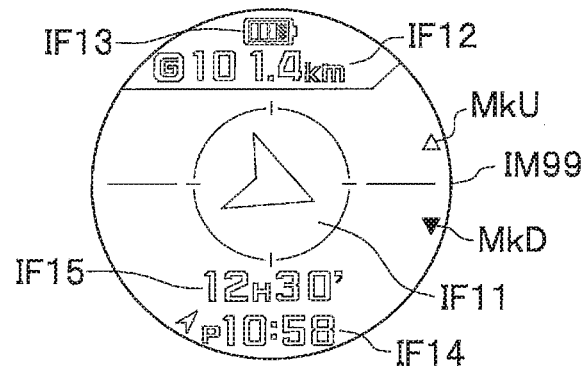
(PRESSED)3SW+4SW ↑  ↓ 3SW+4SW(PRESSED)
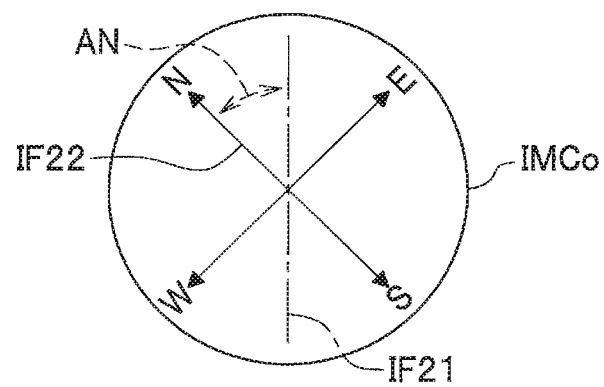

PORTABLE ELECTRONIC TIMEPIECE, DISPLAY METHOD, AND STORAGE MEDIUM

BACKGROUND OF THE INVENTION

1. Field of the Invention

The present invention relates to a portable electronic timepiece, a display method, and a storage medium.

2. Description of the Related Art

Conventionally, portable electronic timepieces, such as wristwatches, having a function of acquiring positional information using a global positioning system (GPS) are widely used. Further, for car navigation systems and terminal devices such as smartphones, it is a conventional practice to acquire, from a server in a remote location, topographic information on topographic features (topographic map) of a predetermined area, set route information on a route to a predetermined destination in association with the topographic information, and display the route information etc. as navigation information on a display unit (see, for example, Japanese Patent Application Laid-Open No. 2015-060144). Recently, it has been proposed to display the navigation information on a display unit of a portable electronic timepiece, as in the car navigation systems or the smartphones or other terminal devices. Such a portable electronic timepiece can be used when a user plays sport involving movement across a distance, e.g. running, jogging, or climbing, to trace the path the user has taken, or to check route information while the user is moving, with the route information on a traveling route the user wishes to follow being set in advance in association with the topographic information.

The navigation information includes a wide variety of information including the topographic features. In contrast, a portable electronic timepiece such as a wristwatch is compact in size and has a small display unit, so it is difficult for the portable electronic timepiece to display the navigation information in detail or to provide an advanced user interface as in the car navigation system or the terminal device such as a smartphone. The car navigation system or the smartphone or other terminal device may have its display unit increased in size. On the contrary, wristwatches are generally desired to be lighter in weight, and those increased in size would cause negative impressions. This makes it hard to increase the size of the display unit thereof.

For such a portable electronic timepiece, it is desired even for a compact device such as a wristwatch to achieve an advanced information providing capability. Particularly when a user is tired, the judgment of the user is impaired. It is therefore desired for the portable electronic timepiece to achieve the advanced information providing capability that allows the user, by just glancing at the display unit, to intuitively recognize information highly convenient for the user, such as information on the direction and/or distance to his/her predetermined destination.

SUMMARY OF THE INVENTION

To solve the above problems, a portable electronic timepiece according to a preferred embodiment of the present invention includes:
a display unit which displays an image; and
a processor, the processor being operative to
display, on the display unit, route information on a traveling route of a user,
switch a scale of the route information displayed on the display unit, and
in a case where a given point set in association with the route information of a predetermined scale cannot be displayed within a display range of the display unit, change a display mode of the display unit to a display mode that is different from a display mode of displaying the route information.

BRIEF DESCRIPTION OF THE DRAWINGS

FIG. 4 illustrates a display screen of the wristwatch displayed in response to the navigation processing starting manipulation;

FIG. 7 illustrates a display screen of the wristwatch displayed in response to the navigation processing executing manipulation;

FIG. 10 is a flowchart illustrating an operation of the wristwatch in response to a manipulation for displaying a backtrack screen;

FIG. 11 illustrates a display screen of the wristwatch displayed in response to the backtrack screen displaying manipulation;

FIG. 13 illustrates a display screen of the wristwatch displayed in response to the navigation processing quitting manipulation;

FIG. 15 illustrates a display screen of the wristwatch displayed in response to the goal point information deleting manipulation; and FIG. 16 illustrates a display screen of the wristwatch displayed in response to a manipulation for switching a display between a destination direction screen and a compass screen.

DETAILED DESCRIPTION OF THE PREFERRED EMBODIMENT

Figure 1:
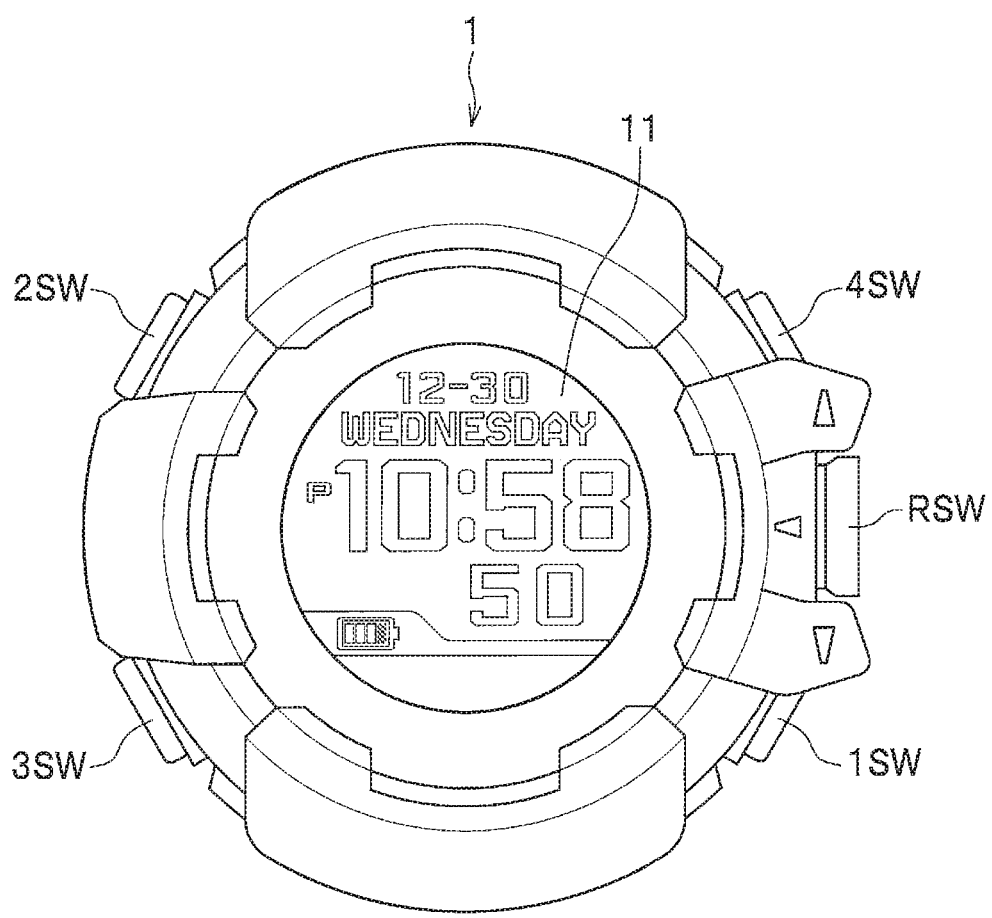
FIG. 1 is a front view showing the appearance of a wristwatch as a portable electronic timepiece according to an embodiment.

A preferred embodiment (hereinafter, referred to as "present embodiment") will be described in detail below with reference to the drawing. It should be noted that each figure only schematically illustrates the present embodiment just enough to allow good understanding thereof. Thus, the present embodiment is not limited to the illustrated examples. Throughout the figures, common or like components are denoted by the same reference characters, and the description thereof will not be repeated.

Embodiment

<Configuration of Wristwatch as Portable Electronic Timepiece>

Figure 2:
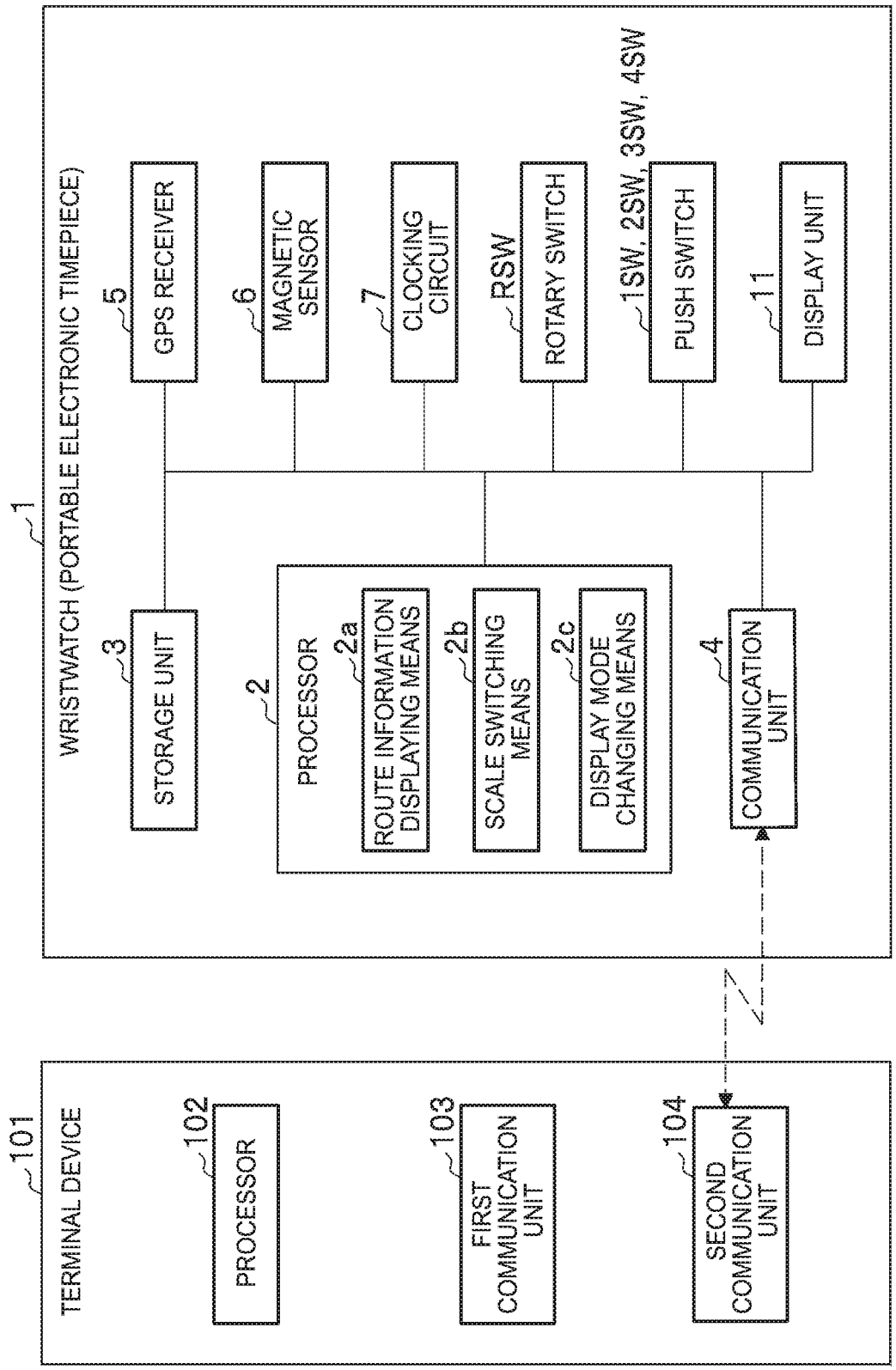
FIG. 2 is a block diagram showing the internal configuration of the wristwatch as a portable electronic timepiece according to the embodiment.

The configuration of a wristwatch 1 as a portable electronic timepiece according to the present embodiment will be described below with reference to FIGS. 1 and 2. FIG. 1 is a front view showing the appearance of the wristwatch 1 as a portable electronic timepiece according to the present embodiment. FIG. 2 is a block diagram showing the internal configuration of the wristwatch 1.

As shown in FIG. 1, the wristwatch 1 as a portable electronic timepiece according to the present embodiment has, as its exterior components, a rotary switch RSW accepting a pressing manipulation and a rotating manipulation, push switches 1SW, 2SW, 3SW, and 4SW accepting a pressing manipulation, and a display unit 11 displaying various types of information thereon.

As shown in FIG. 2, the wristwatch 1 has, as its internal components, a processor 2 which controls operations of respective units; a storage unit 3 which stores various programs and information; a communication unit 4 which communicates with another device (for example, a terminal device 101 such as a smartphone); a GPS receiver 5 which acquires current location information from a GPS satellite; a magnetic sensor 6 which senses the terrestrial magnetism; and a clocking circuit 7 which clocks time.

The processor 2, which is configured with a central processing unit (CPU), executes a control program stored in a read only memory (ROM) (not shown) in the storage unit 3 to function, for example, as: a route information displaying means 2a which displays route information on a traveling route of a user on the display unit 11; a scale switching means 2b which switches a scale of the route information displayed on the display unit 11; and a display mode changing means 2c which changes a display mode of the display unit 11 (display screen). Particularly, in the present embodiment, the display mode changing means 2c has a function of, when the route information of a predetermined scale falls outside the display unit 11 (display screen), automatically changing the display mode of the display unit 11 (display screen) to a display mode that is different from the display mode of displaying the route information. The route information is set in association with topographic information on the topographic features of a predetermined area.

The storage unit 3, which includes a ROM (not shown) and a random access memory (RAM) (not shown), stores in advance a control program which causes the processor 2 to function as the route information displaying means 2a, the scale switching means 2b, and the display mode changing means 2c.

The communication unit 4 communicates with another device (for example, the terminal device 101 such as a smartphone) in a wired or wireless manner. In the present embodiment, it is assumed that the communication unit 4 has a Bluetooth Low Energy (BLE) (registered trademark) communication function and uses the BLE communication function to communicate with a second communication unit 104 included in the terminal device 101. It is also assumed that the wristwatch 1 uses the communication unit 4 to communicate with the terminal device 101, such as a smartphone, to acquire navigation information from the terminal device 101.

It should be noted that, in the present embodiment, it is assumed that the terminal device 101 such as a smartphone has a processor 102 which performs various calculations, a first communication unit 103 which communicates with a server (not shown) in a remote location via a network, and the second communication unit 104 which communicates with the wristwatch 1 using the BLE communication function.

The navigation information includes route information on a traveling route of a user, and destination information on one or more destinations.

With the configuration as described above, a user manipulates the terminal device 101 in advance to start an application program (not shown) for a predetermined navigation system, and acquires, from a server (not shown) in a remote location, topographic information on topographic features (topographic map) of a predetermined area. Next, the user manipulates the terminal device 101 to create navigation information. For creating the navigation information, the user uses a setting function of the application program (not shown) for the navigation system, to set route information on a traveling route of the user and destination information on a destination of the user, in association with the acquired topographic information. In this case, the user initially sets a start point of the traveling route, and then sets, for example, a goal point, halfway passing point, or other point as the destination.

The user then manipulates the wristwatch 1 (or the terminal device 101) to transfer information such as the route information and the destination information as the navigation information from the terminal device 101 to the wristwatch 1. In this manner, the navigation information is stored in the storage unit 3 in the wristwatch 1.

Afterwards, when the user plays sport involving movement across a distance, such as running, jogging, or climbing, the user carries the wristwatch 1 to a predetermined area. At the start point, the user manipulates the wristwatch 1 to display a screen for use in navigation (hereinafter, referred to as "navigation screen") on the display unit 11 of the wristwatch 1 for execution of navigation processing (route guiding processing). The navigation screen is a screen that contains route information, destination information, and others as the navigation information.

<Operation of Wristwatch as Portable Electronic Timepiece>

A description will now be made about an operation of the wristwatch 1 related to navigation processing by referring to FIGS. 3 to 16.

(Operation in Response to Navigation Processing Starting Manipulation)

Figure 3:
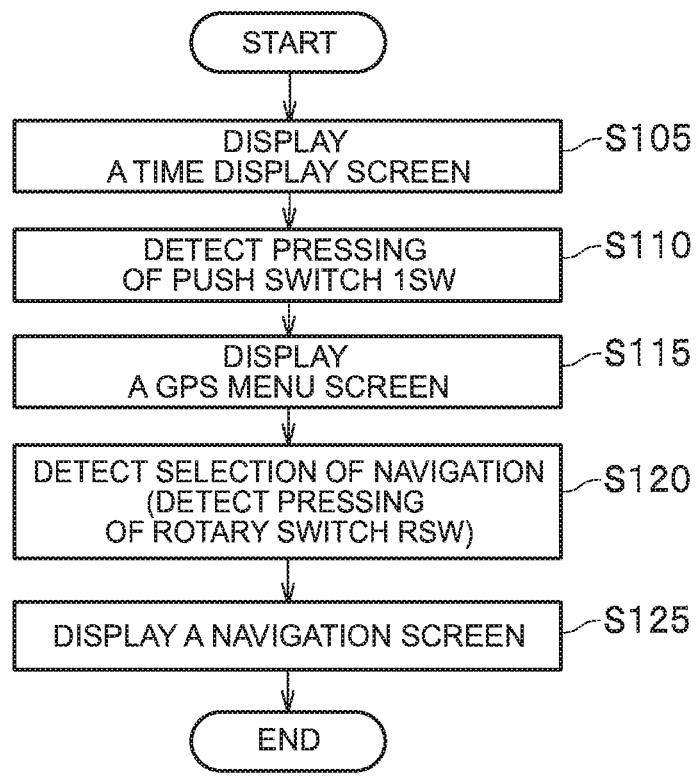
FIG. 3 is a flowchart illustrating an operation of the wristwatch in response to a manipulation for starting navigation processing.

Firstly, an operation of the wristwatch 1 in response to a manipulation for starting navigation processing will be described with reference to FIGS. 3 and 4. FIG. 3 is a flowchart illustrating an operation of the wristwatch 1 in response to a manipulation for starting navigation processing. FIG. 4 illustrates a display screen of the wristwatch 1 displayed in response to the navigation processing starting manipulation.

In the example shown in FIG. 3, a time display screen IM11 (see FIG. 4) is displayed on the display unit 11 of the wristwatch 1 in an initial state of accepting the navigation processing starting manipulation (step S105).

The time display screen IM11 is a screen for displaying the current time. In the example shown in FIG. 4, the time display screen IM11 has date information, current time information, and residual battery capacity information displayed thereon. Among them, the current time information, which is particularly important, is displayed in a size larger than the other information.

In the state where the time display screen IM11 is displayed, the user presses the push switch 1SW, for example. Then, the processor 2 of the wristwatch 1 detects the pressing, and displays a GPS menu screen IM12 (see FIG. 4) on the display unit 11 (steps S110 and S115).

The GPS menu screen IM12 is a screen allowing a user to select one of a variety of processing related to the GPS function. In the example shown in FIG. 4, the GPS menu screen IM12 has the following fields displayed in a selectable manner: a "NAVIGATION" field for selection of navigation processing, a "POINT MEMO" field for selection of processing of reading memo information on each point, a "RECALL" field for selection of processing of recalling a variety of information, and a "SETTING" field for selection of various setting processing.

In the state where the GPS menu screen IM12 is displayed, the user presses the rotary switch RSW with the NAVIGATION field being selected by a selection mark (in the example shown in FIG. 4, the outlined triangle mark). Then, the processor 2 of the wristwatch 1 detects the pressing, and displays a track display screen IM13 (see FIG. 4) on the display unit 11 (steps S120 and S125).

The track display screen IM13 is a screen (navigation screen) for displaying, among others, route information on a route to a predetermined destination as the navigation information.

The track display screen IM13 is a wide-area schematic screen that schematically displays a topographic map of a wide area on a minimum scale set in advance. In the example shown in FIG. 4, however, for better understanding of the configuration of the screen, the topographic map itself is omitted and, instead, a user's traveling route set in association with the topographic map is shown. The area of the topographic map displayed on a screen decreases (becomes smaller) with increased scale size. The area of the topographic map displayed on a screen increases (becomes larger) with decreased scale size.

It should be noted that in the example shown in FIG. 4, the value of 40 km is set as the scale (minimum scale) of the track display screen IM13. The topographic map with its lengthwise and breadthwise dimensions being several times the scale (the minimum scale) is displayed within the display screen. Here, the minimum scale value of 40 km has been set, by taking into consideration that the longest possible distance (longest possible movement amount) on foot for a user would be about 100 km a day, so as to make it possible to display a topographic map including an area that covers that traveling distance. However, the minimum scale value is not limited to 40 km; it can be changed as appropriate according to the mode of application. For example, the minimum scale value can be increased from 40 km and set to 50 km or 60 km, or it can be decreased from 40 km and set to 30 km or 20 km.

The navigation information has been created in advance in the terminal device 101 (see FIG. 2) and transferred from the terminal device 101 to the wristwatch 1. In the example shown in FIG. 4, the track display screen IM13 has navigation information displayed thereon, which includes a traveling route of the user, which has been set in association with the topographic map, a mark "S", a mark "G", a mark "1", a mark "2", and a double circle mark MkPr.

The mark "S" represents a start point. The mark "G" represents a goal point. The marks "1" and "2" represent a first passing point and a second passing point, respectively. The double circle mark MkPr represents a current location of the user. Hereinafter, the double circle mark MkPr will be referred to as "current location mark MkPr".

When creating the navigation information using the terminal device 101 (see FIG. 2) as described above, the user can set any location as a start point, a goal point, or a passing point, by manipulating the terminal device 101.

While two passing points with the marks "1" and "2" are set in the example shown in FIG. 4, a user can set the number of passing points and their locations as appropriate according to the mode of application when the user creates the navigation information.

The current location mark MkPr (the double circle mark) is arranged approximately at the center of the navigation screen. As a user moves, the displayed position of the current location mark MkPr on the navigation screen remains unchanged, but the displayed positions of the remaining information, including the topographic map and the traveling route, are shifted in the direction opposite to the direction in which the user moves, by an amount corresponding to the traveling distance (movement amount) of the user.

In the state where the track display screen IM13 is displayed, the user presses the rotary switch RSW. Then, the processor 2 of the wristwatch 1 detects the pressing, and displays a track display screen IM14 (see FIG. 4) on the display unit 11.

The track display screen IM14 is a navigation screen which accepts a user manipulation for changing the scale of the topographic map. Likewise the track display screen IM13 (see FIG. 4), the track display screen IM14 is a wide-area schematic screen that schematically displays a topographic map of a wide area on a minimum scale set in advance. The track display screen IM14 is different from the track display screen IM13 in that a mark MkU and a mark MkD are displayed thereon. The mark MkU is an isosceles triangle mark with its apex located above its base. The mark MkD is an isosceles triangle mark with its apex located beneath its base.

The marks MkU and MkD represent the directions in which the rotary switch RSW can be rotated. The mark MkU in the state of being in black, for example, indicates that the rotary switch RSW can be rotated clockwise. The mark MkD in the state of being in black (or, with its color changed to black), for example, indicates that the rotary switch RSW can be rotated counterclockwise. Hereinafter, the mark MkU will be referred to as "clockwise rotation mark MkU", and the mark MkD will be referred to as "counterclockwise rotation mark MkD".

(Operation in Response to Navigation Processing Executing Manipulation)

Figure 5:
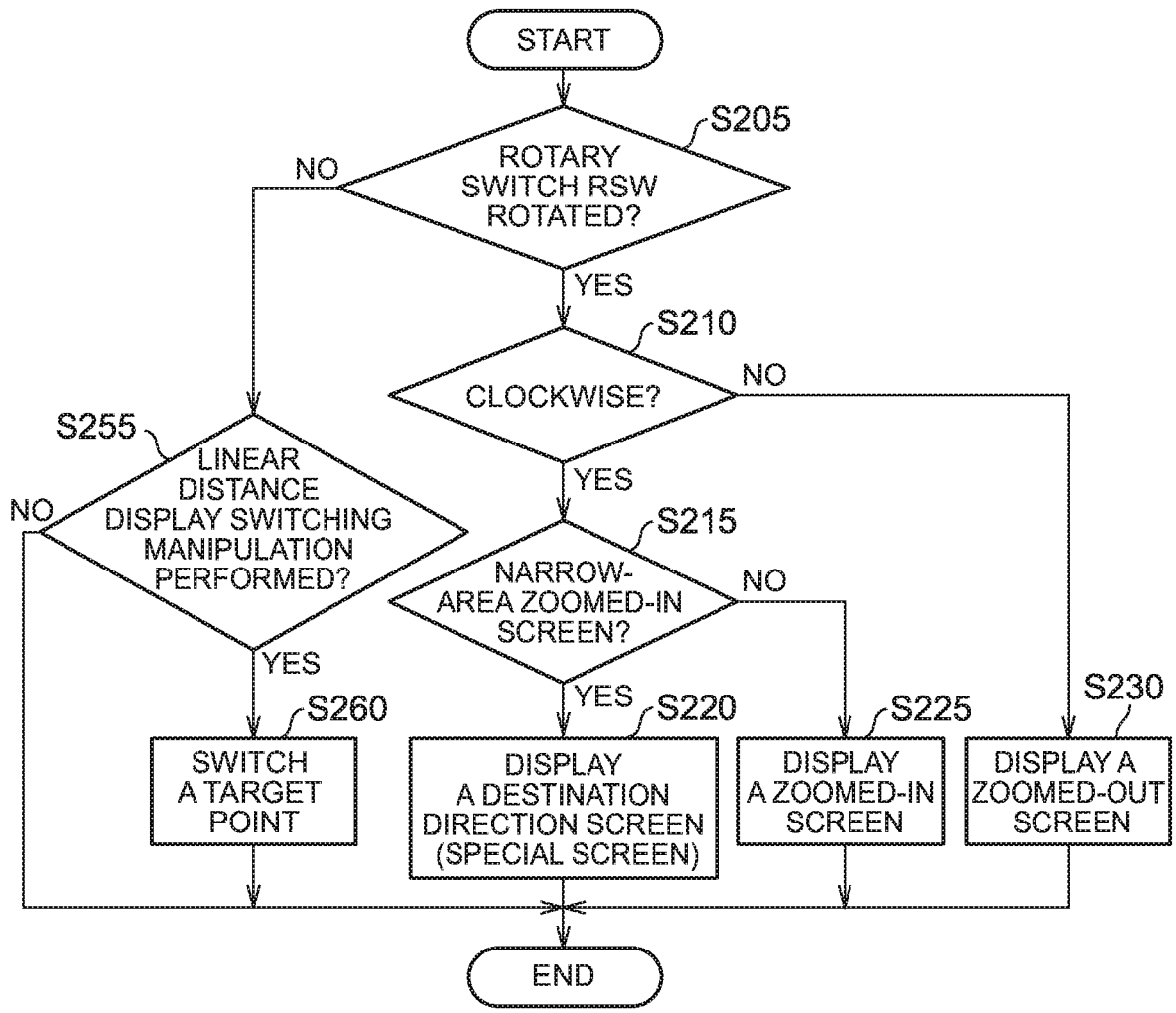
FIG. 5 is a flowchart illustrating an operation of the wristwatch in response to a manipulation for executing navigation processing.
Figure 6:
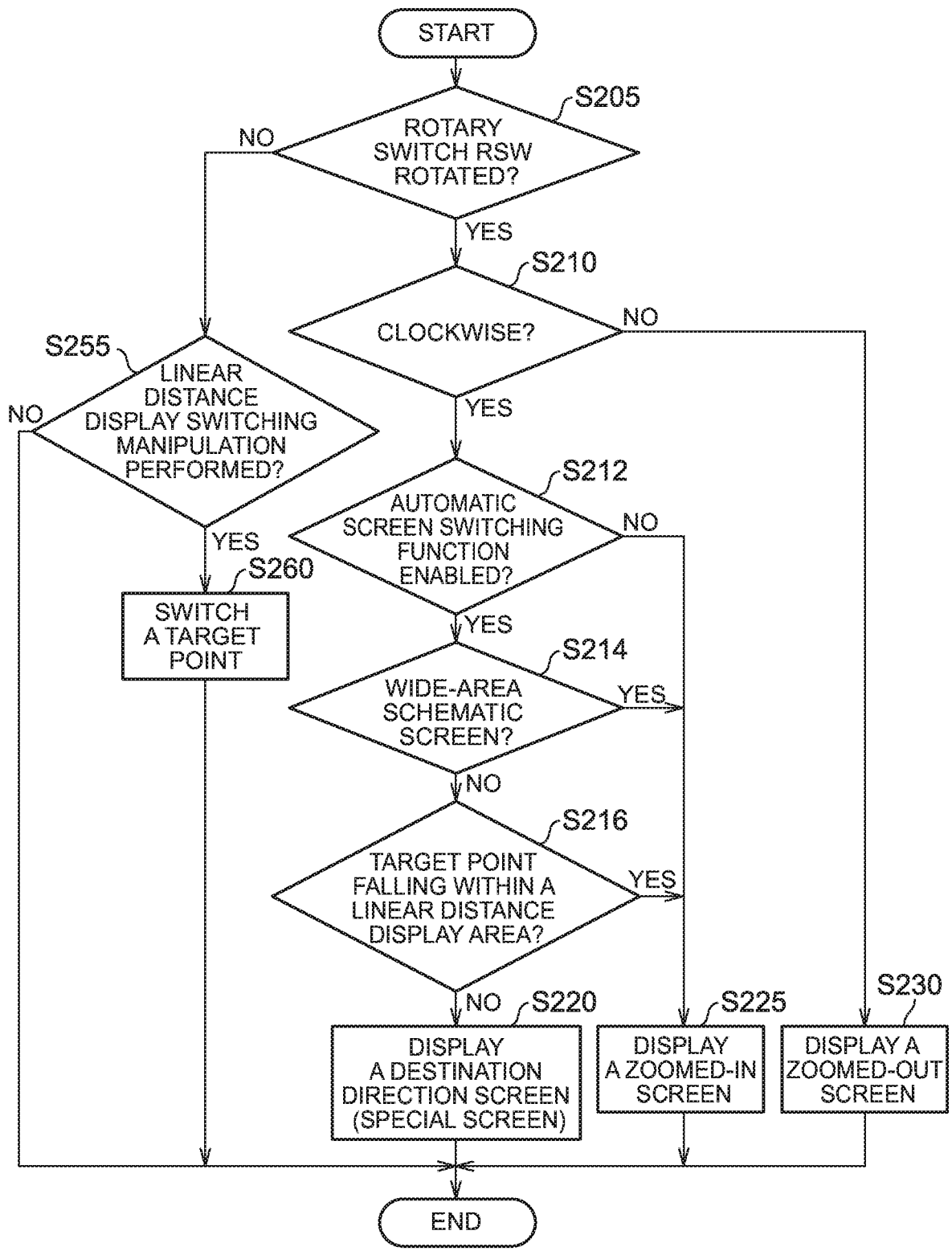
FIG. 6 is a flowchart illustrating an operation of the wristwatch in response to a manipulation for executing navigation processing according to a modification.
Figure 8:
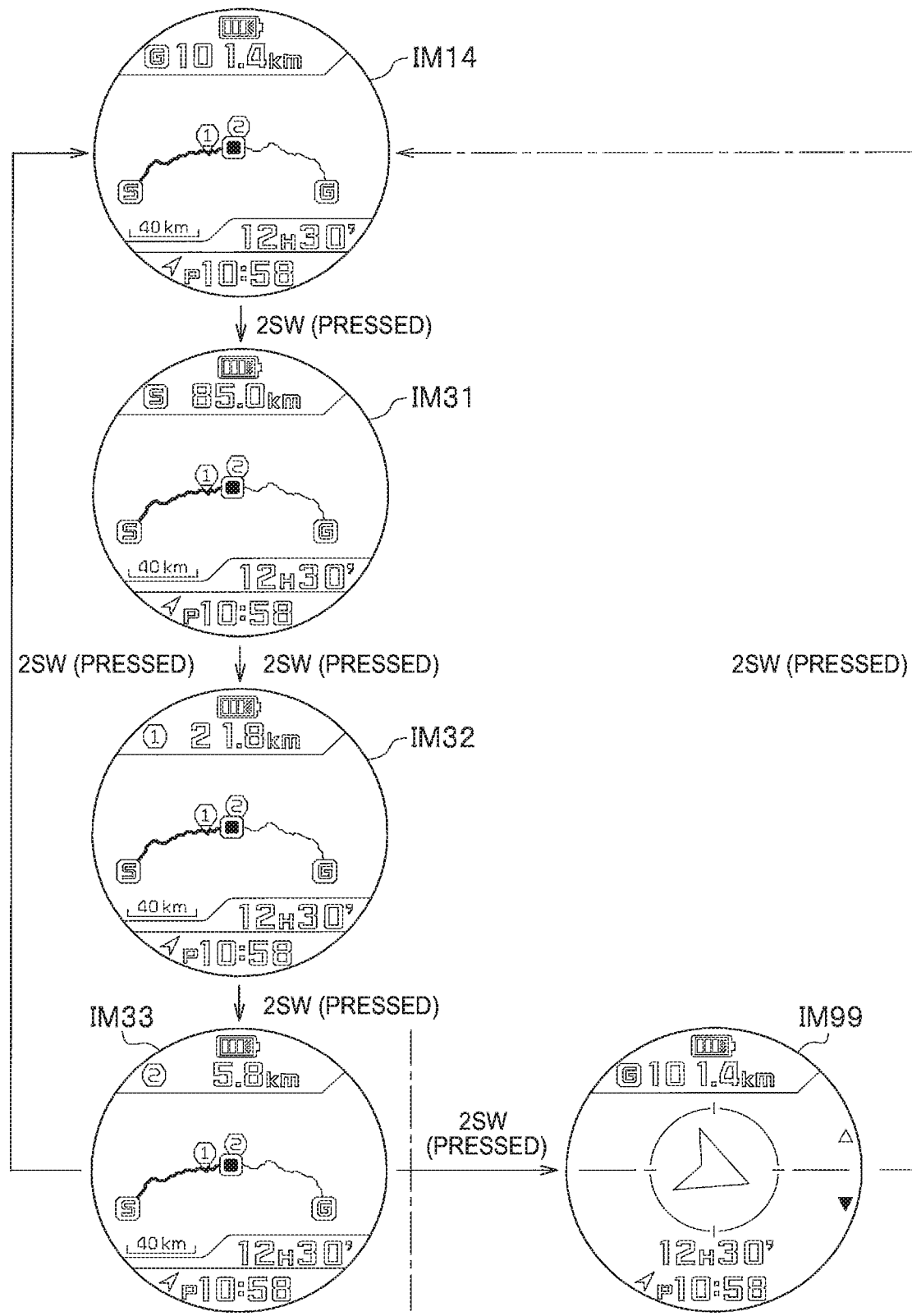
FIG. 8 illustrates a display screen of the wristwatch displayed in response to a target point switching manipulation.

An operation of the wristwatch 1 in response to a manipulation for executing the navigation processing will now be described with reference to FIGS. 5 to 8. FIG. 5 is a flowchart illustrating an operation of the wristwatch 1 in response to a navigation processing executing manipulation. FIG. 6 is a flowchart illustrating an operation of the wristwatch 1 in response to the navigation processing executing manipulation according to a modification. FIG. 7 illustrates a display screen of the wristwatch 1 displayed in response to the navigation processing executing manipulation. FIG. 8 illustrates a display screen of the wristwatch 1 displayed in response to a target point switching manipulation.

In the present embodiment, it is assumed that the navigation processing executing manipulation is performed as the user manipulates the rotary switch RSW in the state where the above-described track display screen IM14 (see FIGS. 4 and 7) is displayed on the display unit 11 of the wristwatch 1.

As shown in FIG. 5, the processor 2 of the wristwatch 1 determines whether the rotary switch RSW has been rotated in the state where the track display screen IM14 (see FIG. 7) is displayed on the display unit 11 (step S205). If it is determined in the step S205 that the rotary switch RSW has been rotated (in the case of "Yes"), the processor 2 of the wristwatch 1 determines whether the rotary switch RSW has been rotated clockwise (step S210).

If it is determined in the step S210 that the rotary switch RSW has been rotated clockwise (in the case of "Yes"), the processor 2 of the wristwatch 1 determines whether the display screen is a narrow-area zoomed-in screen (in the present embodiment, a track display screen IM22 (see FIG. 7) described later) that displays a narrow area in an enlarged view (step S215).

If it is determined in the step S215 that the display screen is a narrow-area zoomed-in screen (in the present embodiment, the track display screen IM22 (see FIG. 7)) (in the case of "Yes"), the processor 2 of the wristwatch 1 displays a destination direction screen IM99 (see FIG. 7) (described later) on the display unit 11 (step S220), and exits a series of routine processing.

On the other hand, if it is determined in the step S215 that the display screen is not the narrow-area zoomed-in screen (the track display screen IM22 (see FIG. 7) in the present embodiment) (in the case of "No"), the processor 2 of the wristwatch 1 displays, on the display unit 11, a navigation screen having the topographic map zoomed in as compared to the currently displayed screen (step S225), and exits the series of routine processing.

Further, if it is determined in the above step S210 that the rotary switch RSW has been rotated counterclockwise (in the case of "No"), the processor 2 of the wristwatch 1 displays, on the display unit 11, a navigation screen having the topographic map zoomed out as compared to the currently displayed screen (step S230), and exits the series of routine processing.

Further, if it is determined in the above step S205 that the rotary switch RSW has not been rotated (in the case of "No"), the processor 2 of the wristwatch 1 determines whether a manipulation for switching a linear distance display has been performed (step S255).

The linear distance display switching manipulation is a manipulation for switching a display screen (navigation screen) as shown in FIG. 8, for example. It is here assumed that the linear distance display switching manipulation is a user manipulation of pressing the push switch 2SW.

If it is determined in the step S255 that the linear distance display switching manipulation has been performed (in the case of "Yes"), the processor 2 of the wristwatch 1 performs target point switching processing of switching a target point displayed, as shown in FIG. 8 for example (step S260).

On the other hand, if it is determined in the step S255 that the linear distance display switching manipulation has not been performed (in the case of "No"), the series of routine processing is terminated.

It should be noted that the flow shown in FIG. 5 can be changed to, for example, a flow shown in FIG. 6. The flow shown in FIG. 6 corresponds to the case of utilizing an automatic screen switching function with which the navigation screen is switched automatically in accordance with a certain condition.

The flow shown in FIG. 6 differs from the flow shown in FIG. 5 in that steps S212, S214, and S216 are performed instead of the step S215.

For example, as shown in FIG. 6, if it is determined in the step S210 that the rotary switch RSW has been rotated clockwise (in the case of "Yes"), the processor 2 of the wristwatch 1 determines whether the automatic screen switching function is enabled (step S212).

If it is determined in the step S212 that the automatic screen switching function is not enabled (in the case of "No"), the process proceeds to step S225. On the other hand, if it is determined in the step S212 that the automatic screen switching function is enabled (in the case of "Yes"), the processor 2 of the wristwatch 1 determines whether the display screen is a wide-area schematic screen (in the present embodiment, the track display screen IM14 (see FIG. 7)) which displays a wide area schematically (step S214).

If it is determined in the step S214 that the display screen is the wide-area schematic screen (in the case of "Yes"), the process proceeds to step S225. On the other hand, if it is determined in the step S214 that the display screen is not the wide-area schematic screen (in the case of "No"), the processor 2 of the wristwatch 1 determines whether a target point designated by the user falls within a linear distance display area (within the display screen) (step S216).

Here, the "target point" means, for example, a goal point, a passing point, or other point that is likely to serve as a landmark for the navigation. One or more points can be set as the "target point(s)" as appropriate, by a user manipulation or by automatic processing according to a control program. For example, a "target point" may be a point yet to be passed through by the user, or a point to be passed through next by the user.

If it is determined in the step S216 that the target point (for example, the goal point or a passing point) is within the linear distance display area (in the case of "Yes"), the process proceeds to step S225. On the other hand, if it is determined in the step S216 that the target point (for example, the goal point or a passing point) is not within the linear distance display area (in the case of "No"), the process proceeds to step S220. It should be noted that the case where "the target point (for example, the goal point or a passing point) is not within the linear distance display area" means the case where the target point that has been set in association with the route information falls outside the display screen.

Examples of the display screen (navigation screen) displayed on the display unit 11 according to the processing in steps S205 through S230 in FIG. 5 (or FIG. 6) will now be described with reference to FIG. 7.

As shown in FIG. 7, in the state where the track display screen IM14 is displayed on the display unit 11, when the user rotates the rotary switch RSW (see the step S205 in FIG. 5 (or FIG. 6)) clockwise by referring to the clockwise rotation mark MkU on the track display screen IM14, the processing in the step S225 in FIG. 5 (or FIG. 6) is performed. Accordingly, as shown in FIG. 7, each time the rotary switch RSW is rotated clockwise in the above-described manner, the display screen (navigation screen) is sequentially switched from the track display screen IM14 to a track display screen IM21, and from the track display screen IM21 to the track display screen IM22.

Further, as shown in FIG. 7, in the state where the track display screen IM22 is displayed on the display unit 11 as a result of the processing in the step S225 in FIG. 5 (or FIG. 6), when the user rotates the rotary switch RSW counterclockwise by referring to the counterclockwise rotation mark MkD on the track display screen IM22, the processing in the step S230 in FIG. 5 (or FIG. 6) is performed. Accordingly, as shown in FIG. 7, each time the rotary switch RSW is rotated counterclockwise in the above-described manner, the display screen (navigation screen) is sequentially switched from the track display screen IM22 to the track display screen IM21, and from the track display screen IM21 to the track display screen IM14.

Furthermore, as shown in FIG. 7, in the state where the track display screen IM22 is displayed on the display unit 11, when it is determined in the step S215 in FIG. 5 that the display screen is the narrow-area zoomed-in screen (the track display screen IM22) (in the case of "Yes"), the processing in the step S220 in FIG. 5 is performed. In response thereto, as shown in FIG. 7, the display screen (navigation screen) is switched from the track display screen IM22 to the destination direction screen IM99.

Alternatively, as shown in FIG. 7, in the state where the track display screen IM22 is displayed on the display unit 11, when it is determined in the step S216 in FIG. 6 that the target point (for example, the goal point or a passing point) is not within the linear distance display area (the display screen) (in the case of "No"), the processing in the step S220 in FIG. 6 is performed. In response thereto, as shown in FIG. 7, the display screen (navigation screen) is switched from the track display screen IM22 to the destination direction screen IM99.

The track display screen IM14 (see FIG. 7) described above is a wide-area schematic screen that displays a topographic map of a wide area schematically on a preset minimum scale, likewise the track display screen IM13 (see FIG. 4).

The track display screen IM21 (see FIG. 7) described above is a medium-wide area screen that displays a topographic map of a medium-wide area on a preset medium scale (of 4 km in the illustrated example).

The track display screen IM22 (see FIG. 7) described above is a narrow-area zoomed-in screen that displays a topographic map of a narrow area in an enlarged view on a preset maximum scale (of 2 km in the illustrated example).

It is here assumed that the scale on which a target point (for example, the goal point or a passing point) that has been set in association with the route information falls outside the display screen corresponds to a maximum scale, and that the track display screen IM22 is a navigation screen of the maximum scale. Therefore, in the present embodiment, the case where it is determined in the step S215 in FIG. 5 that the display screen is the narrow-area zoomed-in screen (the track display screen IM22) (the case of "Yes") means the case where a target point set in association with the route information of a predetermined scale falls outside the display screen.

The destination direction screen IM99 (see FIG. 7) described above is a special screen which displays, particularly and preferentially, information highly convenient for a user, such as information on the direction and/or distance from the current location of the user to a predetermined destination (for example, the goal point).

It is here assumed that a predetermined destination is the goal point and that the destination direction screen IM99 (see FIG. 7) displays, as the navigation information, information on the direction and distance from the current location of the user to the goal point. However, the wristwatch 1 may set, besides the goal point, any point (for example, a start point, a first passing point, a second passing point, a point the user is about to pass through next, etc.) as a predetermined destination, depending on the use conditions.

In the present embodiment, the destination direction screen IM99 is configured to include direction information IF11, distance information IF12, residual battery capacity information IF13, current time information IF14, and elapsed time information IF15.

The direction information IF11 indicates a direction of a predetermined destination (for example, the goal point).

The distance information IF12 indicates a distance to a predetermined destination (for example, the goal point).

The residual battery capacity information IF13 indicates residual battery capacity.

The current time information IF14 indicates the current time.

The elapsed time information IF15 indicates the amount of time elapsed from when the user started traveling.

The direction information IF11 described above indicates the direction of a predetermined destination (for example, the goal point) with the direction pointed to by an arrow. It should be noted that, in the present embodiment, with the apical direction of the wristwatch 1 (i.e. the twelve o'clock direction on the analog clock face) regarded as the north direction, the arrow direction of the direction information IF11 indicates the direction of a predetermined destination with respect to the north direction.

In the destination direction screen IM99, particularly, the information highly convenient for a user, such as the direction information IF11 and the distance information IF12, is displayed in an enlarged view as compared to the other information which is less convenient for the user. The destination direction screen IM99 thus allows the user to efficiently visually recognize the information highly convenient for the user, such as the direction information IF11 and the distance information IF12.

It should be noted that the wristwatch 1 can be set to display another navigation screen on a scale which falls between two scales used for the track display screen IM14 and the track display screen IM21, according to the mode of application. Similarly, the wristwatch 1 can be set to display another navigation screen on a scale which falls between two scales used for the track display screen IM21 and the track display screen IM22, according to the mode of application.

The processor 2 of the wristwatch 1 (specifically, the display mode changing means 2c (see FIG. 2)) displays the track display screen IM14 (the track display screen IM13), the track display screen IM21, or the track display screen IM22 on the display unit 11, as long as a target point (a goal point, a passing point, or the like) that has been set in association with the route information falls within the display unit 11 (display screen).

However, the processor 2 of the wristwatch 1 (specifically, the display mode changing means 2c (see FIG. 2)) displays the destination direction screen IM99 on the display unit 11 when the target point (the goal point, the passing point, or the like) set in association with the route information falls outside the display unit 11 (display screen).

Examples of the display screen (navigation screen) displayed on the display unit 11 according to the processing in the step S260 in FIG. 5 (or FIG. 6) will now be described with reference to FIG. 8.

As shown in FIG. 8, in the state where the track display screen IM14 is displayed on the display unit 11, each time the user presses for example the push switch 2SW, the display screen (navigation screen) is sequentially switched from the track display screen IM14 to a target point display screen IM31, from the target point display screen IM31 to another target point display screen IM32, and from the target point display screen IM32 to another target point display screen IM33.

The target point display screens IM31, IM32, and IM33 are navigation screens which each include information on the corresponding target point (for example, the start point, the goal point, or a passing point).

The processor 2 of the wristwatch 1 (specifically, the display mode changing means 2c (see FIG. 2)) displays the track display screen IM14 (track display screen IM13), the target point display screen IM31, the target point display screen IM32, or the target point display screen IM33 on the display unit 11 as long as a target point (the start point, the goal point, or a passing point) set in association with the route information falls within the display screen. In this case, in the state where the target point display screen IM33 is displayed on the display unit 11, when the user presses for example the push switch 2SW, the display screen (navigation screen) is switched from the target point display screen IM33 to the track display screen IM14.

However, when the target point (the start point, the goal point, or a passing point) set in association with the route information falls outside the display screen, the processor 2 of the wristwatch 1 (specifically, the display mode changing means 2c (see FIG. 2)) displays the destination direction screen IM99 on the display unit 11. In this case, in the state where the target point display screen IM33 is displayed on the display unit 11, each time the user presses for example the push switch 2SW, the display screen (navigation screen) is sequentially switched from the target point display screen IM33 to the destination direction screen IM99, and from the destination direction screen IM99 to the track display screen IM14.

The target point display screen IM31 described above is a navigation screen that displays information on the distance from the current location to the start point (with the mark "S" set therefor). The target point display screen IM32 described above is a navigation screen that displays information on the distance from the current location to the first passing point (with the mark "1" set therefor). The target point display screen IM33 described above is a navigation screen that displays information on the distance from the current location to the second passing point (with the mark "2" set therefor).

Figure 9A:
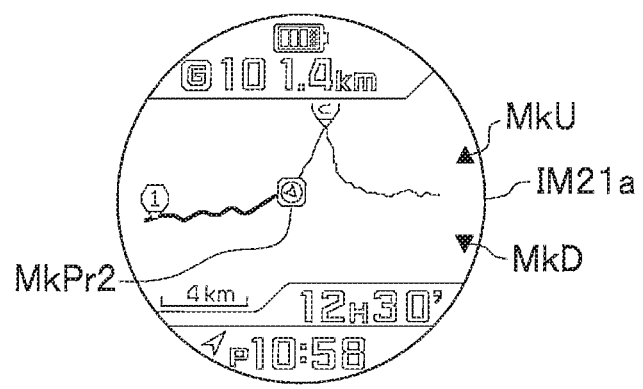
FIGS. 9A and 9B illustrate a display screen of the wristwatch according to a modification.
Figure 9B:
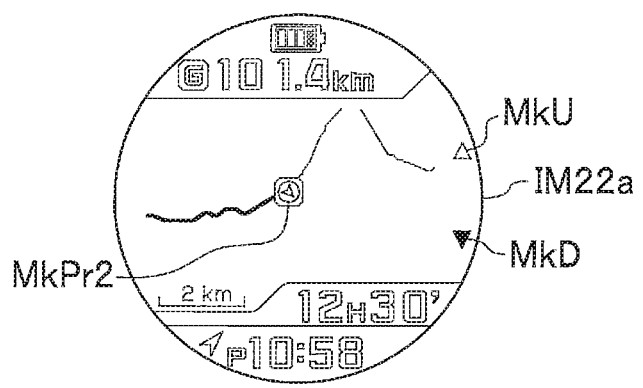

It should be noted that the track display screen IM21 and the track display screen IM22 shown in FIG. 7 may be changed to, for example, a track display screen IM21a shown in FIG. 9A and a track display screen IM22a shown in FIG. 9B, respectively. The track display screen IM21a and the track display screen IM22a differ respectively from the track display screen IM21 and the track display screen IM22 shown in FIG. 7 in that a current location mark MkPr2, instead of the double-circle current location mark MkPr (see FIG. 7), is arranged approximately at the center of the navigation screen. In the present embodiment, the current location mark MkPr2 has a structure with an arrow embedded inside a ring. The arrow functions as the direction information indicating the direction of a predetermined destination (for example, the goal point).

(Operation in Response to Backtrack Screen Displaying Manipulation)

The wristwatch 1 has a backtrack screen displaying function. The "backtrack screen displaying function" is a function of displaying the route from the current location back to the start point. With the "backtrack screen displaying function", the wristwatch 1 displays, for example, the current location as a new start point, and the original start point as a new goal point (see a backtrack display screen IM41 in FIG. 11).

An operation of the wristwatch 1 in response to the backtrack screen displaying manipulation will now be described with reference to FIG. 10. FIG. 10 is a flowchart illustrating an operation of the wristwatch 1 in response to the backtrack screen displaying manipulation.

In the example shown in FIG. 10, the track display screen IM14 (see FIG. 11) described above is displayed on the display unit 11 of the wristwatch 1 in an initial state of accepting the backtrack screen displaying manipulation (step S605).

In the state where the track display screen IM14 is displayed, the user presses the push switch 1SW, for example. Then, the processor 2 of the wristwatch 1 detects the pressing, and displays a navigation menu screen IM15 (see FIG. 11) on the display unit 11 (steps S610 and S615).

The navigation menu screen IM15 is a screen which selectably displays various manipulations in navigation processing. In the example shown in FIG. 11, the navigation menu screen IM15 has the following fields displayed in a selectable manner: a BACKTRACK field for selection of the backtrack screen displaying manipulation, a QUIT field for selection of a manipulation for quitting the navigation processing, and a goal point information deletion (DELETE GOAL) field for selection of a manipulation for deleting the goal point information.

In the state where the navigation menu screen IM15 is displayed, the user presses the rotary switch RSW with the BACKTRACK field selected by a selection mark (in the example shown in FIG. 11, the outlined triangle mark). Then, the processor 2 of the wristwatch 1 detects the pressing, and displays a backtrack display screen IM41 (see FIG. 11) on the display unit 11 (steps S620 and S625). The operation in response to the backtrack screen displaying manipulation is thus finished.

The backtrack display screen IM41 is a screen (navigation screen) which displays route information on a route from the current location to the start point as navigation information for the user to return to the start point from the current location. On the backtrack display screen IM41, the current location is displayed as a new start point (see the mark "S"), and the original start point is displayed as a new goal point (see the mark "G").

(Operation in Response to Navigation Processing Quitting Manipulation)

Figure 12:
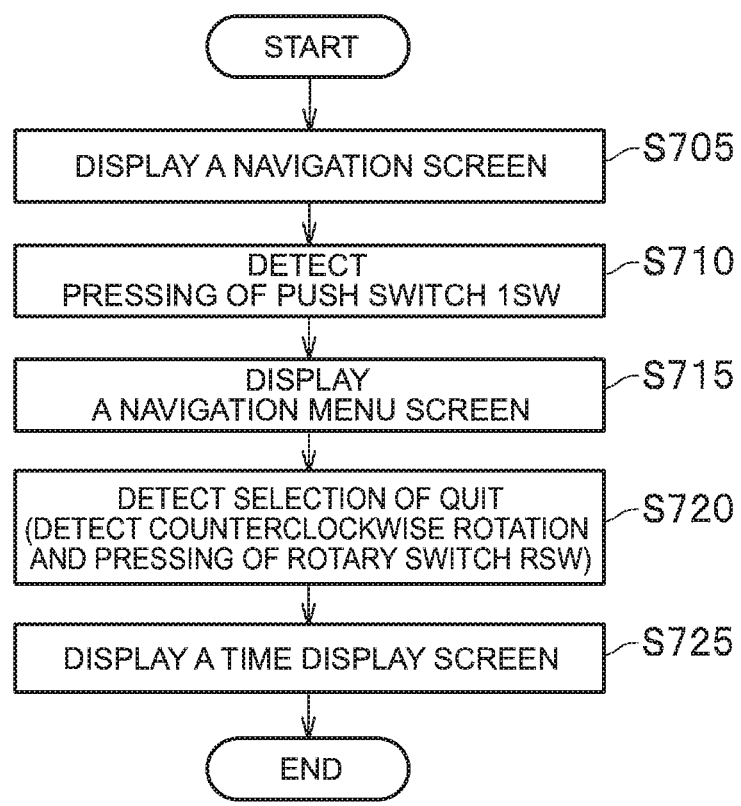
FIG. 12 is a flowchart illustrating an operation of the wristwatch in response to a manipulation for quitting navigation processing.

For termination of the navigation processing, the wristwatch 1 operates as follows. An operation of the wristwatch 1 in response to a manipulation for quitting navigation processing will now be described with reference to FIG. 12. FIG. 12 is a flowchart illustrating an operation of the wristwatch 1 in response to the navigation processing quitting manipulation.

In the example shown in FIG. 12, in an initial state of accepting the navigation processing quitting manipulation, the track display screen IM14 (see FIG. 13) described above is displayed on the display unit 11 of the wristwatch 1 (step S705).

In the state where the track display screen IM14 is displayed, the user presses the push switch 1SW, for example. Then, the processor 2 of the wristwatch 1 detects the pressing, and displays the above-described navigation menu screen IM15 (see FIG. 13) on the display unit 11 (steps S710 and S715).

In the state where the navigation menu screen IM15 is displayed, the user rotates the rotary switch RSW counter-clockwise (or, toward the front) to cause a navigation menu screen IM15a (i.e. a screen with the QUIT field selected by the selection mark (the outlined triangle mark in the example shown in FIG. 13)) to be displayed on the display unit 11. With the navigation menu screen IM15a thus displayed, the user presses the rotary switch RSW. Then, the processor 2 of the wristwatch 1 detects the pressing, and displays the above-described time display screen IM11 (see FIG. 13) on the display unit 11 (steps S720 and S725). The operation in response to the navigation processing quitting manipulation is thus finished.

(Operation in Response to Goal Point Information Deleting Manipulation)

Figure 14:
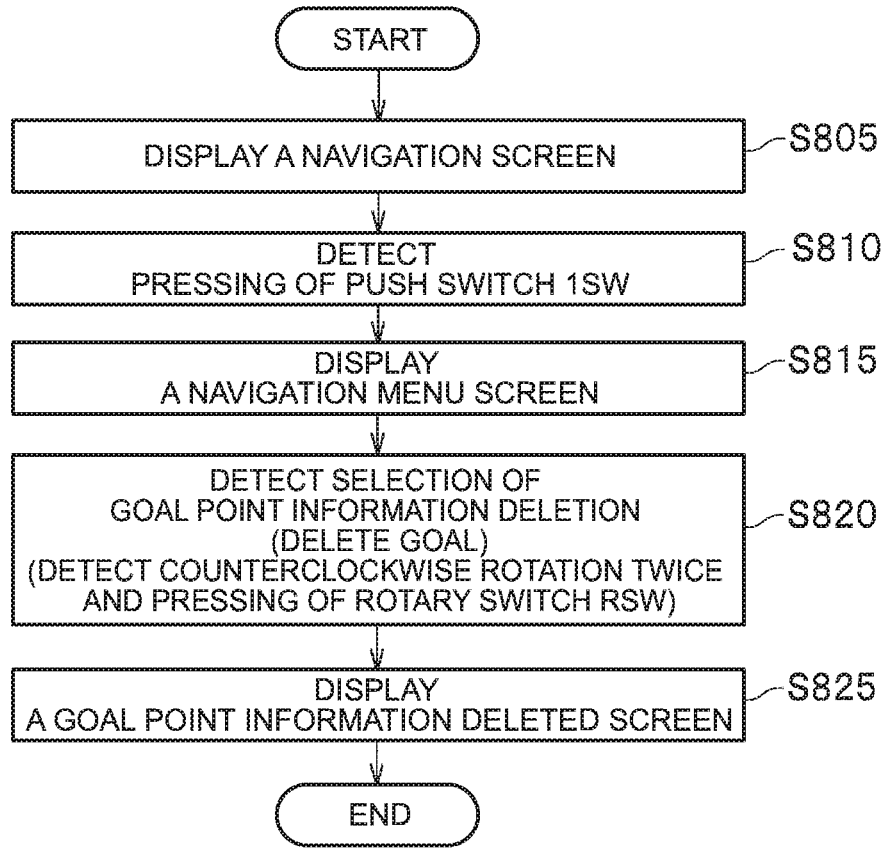
FIG. 14 is a flowchart illustrating an operation of the wristwatch in response to a manipulation for deleting goal point information.

For deletion of goal point information, the wristwatch 1 operates as follows. An operation of the wristwatch 1 in response to a manipulation for deleting goal point information will now be described with reference to FIG. 14. FIG. 14 is a flowchart illustrating an operation of the wristwatch 1 in response to the goal point information deleting manipulation.

In the example shown in FIG. 14, in an initial state of accepting the goal point information deleting manipulation, the above-described track display screen IM14 (see FIG. 15) is displayed on the display unit 11 of the wristwatch 1 (step S805).

In the state where the track display screen IM14 is displayed, the user presses the push switch 1SW, for example. Then, the processor 2 of the wristwatch 1 detects the pressing, and displays the above-described navigation menu screen IM15 (see FIG. 15) on the display unit 11 (steps S810 and S815).

In the state where the navigation menu screen IM15 is displayed, the user rotates the rotary switch RSW counter-clockwise twice (or, toward the front twice) to cause a navigation menu screen IM15b (i.e. a screen with the goal point information deletion (DELETE GOAL) field selected by the selection mark (the outlined triangle mark in the example shown in FIG. 15)) to be displayed on the display unit 11. With the navigation menu screen IM15b thus displayed, the user presses the rotary switch RSW. Then, the processor 2 of the wristwatch 1 detects the pressing, and displays a goal point information deleted screen IM51 (see FIG. 15) on the display unit 11 (steps S820 and S825). The operation in response to the goal point information deleting manipulation is thus finished.

The goal point information deleted screen IM51 is a screen (navigation screen) from which the route information from the current location to the goal point, as the navigation information, has been deleted. The goal point information deleted screen IM51 displays merely the route information from the start point to the current location.

(Operation in Response to Manipulation for Switching Display Between Destination Direction Screen and Compass Screen)

The wristwatch 1 has a function of switching a display between a destination direction screen and a compass screen, which is a function of alternately displaying the above-described destination direction screen IM99 (see FIGS. 7 and 16) and a compass screen IMCo (see FIG. 16) described below.

The destination direction screen IM99 (see FIG. 16) and the compass screen IMCo (see FIG. 16) are displayed on the display unit 11 alternately each time the user performs a predetermined switching manipulation (for example, a manipulation of pressing the push switch 3SW and the push switch 4SW simultaneously).

Here, the compass screen IMCo (see FIG. 16) is a navigation screen which includes information on a direction the user is currently facing. In the example shown in FIG. 16, the compass screen IMCo includes moving direction information IF21 indicating the direction in which the user is moving, and compass information IF22 indicating the four directions of north, south, east, and west (N, S, E, and W). The compass screen IMCo indicates a displacement angle between the north (N) direction and the direction the user is currently facing, by regarding the apical direction of the wristwatch 1 (i.e. the twelve o'clock direction on the analog clock face) as the direction the user is facing. Specifically, the angle AN shown in FIG. 16, made by the line segment showing the moving direction information IF21 and the line segment of the compass information IF22 showing the N direction, corresponds to the displacement angle.

On the destination direction screen IM99 (see FIG. 16), the direction information IF11 indicates the direction of a predetermined destination with respect to the north direction, by regarding the apical direction of the wristwatch 1 (i.e. the twelve o'clock direction on the analog clock face) as the north direction. Thus, if the user is facing a direction displaced from the north (or, if the user is moving in a direction displaced from the north), it will be difficult for the user to recognize in which direction the predetermined destination is located in the four directions of north, south, east, and west (N, S, E, and W) by merely checking the direction information IF11 on the destination direction screen IM99 (see FIG. 16).

Thus, in the present embodiment, the user may firstly switch the navigation screen displayed, from the destination direction screen IM99 (see FIG. 16) to the compass screen IMCo (see FIG. 16). This allows the user to recognize the displacement angle AN between the north (N) direction and the direction the user is facing. Then, the user may turn, from the direction the user is currently facing (or the direction in which he/she is moving), toward the north by the displacement angle AN. This allows the user to face the north direction. In this state, the user may switch the navigation screen displayed, from the compass screen IMCo (see FIG. 16) to the destination direction screen IM99 (see FIG. 16). As a result, with the user himself/herself facing north, the user can recognize in which direction the predetermined destination is located in the four directions of north, south, east, and west (N, S, E, and W) by only checking the direction information IF11 on the destination direction screen IM99 (see FIG. 16).

<Main Features of Wristwatch as Portable Electronic Timepiece>

(1) As shown in FIG. 2, the wristwatch 1 has: the display unit 11 which displays an image; the route information displaying means 2a which displays, on the display unit 11, route information on a traveling route of a user; the scale switching means 2b which switches a scale of the route information displayed on the display unit 11; and the display mode changing means 2c which, in a case where a given target point (for example, a goal point or a passing point) set in association with the route information of a predetermined scale falls outside the display unit 11 (display screen), changes a display mode of the display unit 11 (display screen) to a display mode that is different from a display mode of displaying the route information.

With this configuration, the wristwatch 1 can change the display mode of the display unit 11 (display screen) when a given target point that has been set in association with the route information of a predetermined scale falls outside the display unit 11 (display screen). Accordingly, the wristwatch 1, despite the compactness of the device, can achieve an advanced information providing capability, by suitably displaying information highly convenient for the user, as navigation information.

(2) In the case where the target point (for example, the goal point or a passing point) falls outside the display unit 11 (display screen), the display mode changing means 2c can display, on the display unit 11, a special screen including information on a direction and a distance from a current location of the user to a predetermined destination (for example, the goal point). Specifically, when the target point falls outside the display unit 11 (display screen) as in the case for example of the track display screen IM22 (narrow-area zoomed-in screen) in FIG. 7, the wristwatch 1 can display, on the display unit 11, a special screen which includes the direction information IF11 and the distance information IF12 from the current location of the user to the predetermined destination, as in the destination direction screen IM99 in FIG. 7.

On the destination direction screen IM99 (special screen), particularly, information which is highly convenient for a user, such as the direction information IF11 and the distance information IF12, is displayed in an enlarged view as compared to the other information which is less convenient for the user. As a result, the destination direction screen IM99 (special screen) allows the user to efficiently visually recognize the direction information IF11, the distance information IF12, and other information highly convenient for the user, by only glancing at the screen. Thus, by displaying the destination direction screen IM99 (the special screen) on the display unit 11, the wristwatch 1 allows the user to intuitively recognize the information highly convenient for the user, even in the case where the user is tired and has his/her judgement impaired, for example.

(3) As shown in FIG. 16, the display mode changing means 2c can display the special screen (destination direction screen IM99) including the information on the direction from the current location of the user to the predetermined destination, and the compass screen IMCo including information on the direction the user is currently facing, alternately on the display unit 11 in response to a manipulation by the user.

The wristwatch 1, thus configured to switch a display between the special screen (destination direction screen IM99) and the compass screen IMCo, allows the user to recognize in which direction the predetermined destination is located in the four directions of north, south, east, and west (N, S, E, and W) by merely checking the direction information IF11 on the destination direction screen IM99 (see FIG. 16).

(4) Preferably, the display mode changing means 2c may make a determination to switch the scale in the case where the distance from the current location of the user to the predetermined destination is not shorter than a predetermined distance.

For example, for switching a display between the track display screen IM14 (wide-area schematic screen), the track display screen IM21 (medium-wide area screen), and the track display screen IM22 (narrow-area zoomed-in screen) shown in FIG. 7, the display mode changing means 2c may be configured to automatically switch the display screen by making a determination to switch the scale, without the need of the user manipulation of rotating the rotary switch RSW.

With this configuration, the wristwatch 1 can display a navigation screen on the display unit 11 by automatically switching its scale for example from the track display screen IM21 (see FIG. 7) to the track display screen IM22 (see FIG. 7). This ensures improved usability of the wristwatch.

As described above, according to the wristwatch 1 as the portable electronic timepiece of the present embodiment, it is possible to suitably display information highly convenient for a user, as navigation information, to thereby achieve an advanced information providing capability despite the compactness of the device.

It should be noted that the present invention is not limited to the embodiment described above. Various modifications and alternations can be made without deviating from the gist of the present invention.

For example, the above embodiment has been described in detail for easy understanding of the gist of the present invention. The present invention is not necessarily limited to the embodiment including all the constituent elements described herein. Rather, a constituent element may be added to the other constituent elements, or some of the constituent elements may be replaced with other constituent elements. Some of the constituent elements may even be omitted.

Further, the embodiment has been described above assuming that the predetermined destination is a goal point and that the destination direction screen IM99 (see FIG. 7) displays information on the direction and distance from the current location of the user to the goal point as the navigation information. However, the wristwatch 1 can set, besides the goal point, any point (for example, a start point, a first passing point, a second passing point, etc.) as a predetermined destination, depending on the use conditions.

Furthermore, although the manipulation procedure of the rotary switch RSW, for example, is generally as described above in the embodiment, the manipulation procedures of the push switches 1SW, 2SW, 3SW, and 4SW can be changed as appropriate according to the mode of application.

What is claimed is:

1. A portable electronic timepiece comprising:
a display unit which displays an image; and
a processor that is configured to:
display, on the display unit, route information on a traveling route of a user,
switch a scale of the route information displayed on the display unit, and
in a case where a given point set in association with the route information of a predetermined scale cannot be displayed within a display range of the display unit, terminate the display of the route information on the display unit, and display on the display unit a screen including information on a direction and a distance from a current location of the user to a predetermined destination, without displaying the route information.

2. The portable electronic timepiece according to claim 1, wherein the processor displays on the display unit a screen including the information on the direction from the current location of the user to the predetermined destination and a screen including information on a direction the user is currently facing, alternately on the display unit in response to a manipulation by the user.

3. The portable electronic timepiece according to claim 1, wherein in a case where a distance from a current location of the user to a predetermined destination is not shorter than a predetermined distance, the processor makes a determination to switch the scale.

4. The portable electronic timepiece according to claim 1, wherein in a case where the given point falls outside the display range of the display unit and the given point is a point yet to be passed through by the user, the processor changes the display mode of the display unit to a display mode that is different from the display mode of displaying the route information.

5. A display method performed by a portable electronic timepiece, the electronic timepiece including a display unit which displays an image, the method comprising:
  displaying, on the display unit, route information on a traveling route of a user;
  switching a scale of the route information displayed on the display unit; and
  in a case where a given point set in association with the route information of a predetermined scale cannot be displayed within a display range of the display unit, terminating the display of the route information, and displaying on the display unit a screen including information on a direction and a distance from a current location of the user to a predetermined destination, without displaying the route information.

6. A non-transitory computer-readable storage medium having stored thereon a program that is executable by a computer in a portable electronic timepiece, the electronic timepiece including a display unit which displays an image, the program being executable by the computer to control the computer to perform functions comprising:
  displaying, on the display unit, route information on a traveling route of a user;
  switching a scale of the route information displayed on the display unit; and
  in a case where a given point set in association with the route information of a predetermined scale cannot be displayed within a display range of the display unit, terminating the display of the route information, and displaying on the display unit a screen including information on a direction and a distance from a current location of the user to a predetermined destination, without displaying the route information.

* * * * *